United States Patent Office 2,740,425
Patented Apr. 3, 1956

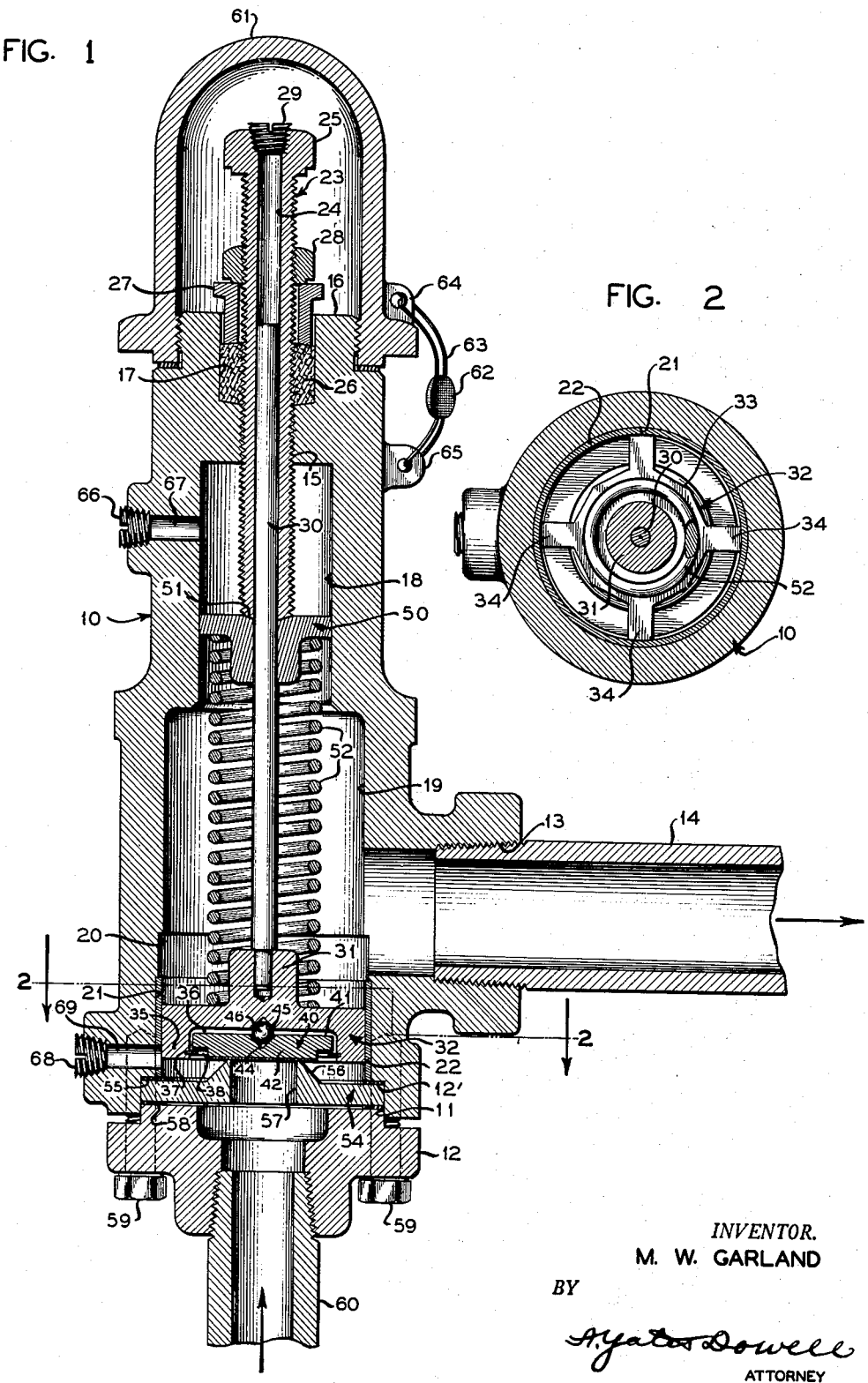

2,740,425

HIGH CAPACITY, GAS TIGHT SEATING, ADJUSTABLE SAFETY VALVE

Milton W. Garland, Waynesboro, Pa., assignor to Frick Company, Waynesboro, Pa., a corporation of Pennsylvania Application June 20, 1951, Serial No. 232,638

7 Claims. (Cl. 137—543.13)

This invention relates to safety valves and more particularly to a spring loaded pop-off valve especially adapted for, although not limited to, use in a refrigeration system.

In the design of a safety valve many factors must be considered. If the circulating fluid is expendable and non-toxic, as in the case of water and steam, its loss may present no substantial problems. In the case of refrigerants, however, which are relatively expensive and which may be toxic, it is essential that loss thereof be prevented.

Another attribute desirable in a safety valve is that it function smoothly without binding in order that it afford relief when required and shut off as soon as the pressure has dropped to the predetermined level. In addition, it is desirable that leakage past the seat be held to an absolute minimum.

In order that the moving parts function smoothly and to reduce the effect of misalignment of the guiding means for the movable parts of the valve, it has been recognized heretofore that a relatively long guide stem is desirable. By the use of a long guide stem, error in the centering of the guide stem has less tendency to cause binding of the movable guide member on the sides of the valve housing. In order to further accommodate misalignment of the valve stem, seat, and movable valve member, various devices have been employed which permit swiveling or similar movement of the movable valve member relative to the valve stem. With such construction the stem merely serves as a push-rod and does not itself assist in the alignment of the movable valve member. With such construction the alignment of the movable valve member is maintained solely by the contact between it and the valve housing. While this arrangement may be satisfactory for certain types of construction, it is not susceptible of the highest accuracy of alignment for which the present construction is particularly adapted.

Accordingly, it is an object of the invention to provide a safety valve which is particularly constructed and adapted for maintaining accurate alignment of the movable valve member within the valve housing.

A further object of the present invention is to provide a safety valve especially adapted for use with refrigerants.

A further object of the invention is to provide a safety valve constructed of a relatively small number of parts so constructed and arranged that fabrication and assembly thereof is facilitated and which provides maximum accuracy of alignment of the movable parts.

These and other objects of the invention will become apparent from the following description taken in conjunction with the accompanying drawings in which:

Fig. 1 is a vertical section through a valve illustrative of an embodiment of my invention; and Fig. 2, a section on the line 2—2 of Fig. 1.

Referring to the drawings, the valve includes a housing or body 10 having a lower opening 11 for accommodating an inlet fitting 12 and a side opening 13 for receiving an outlet pipe 14. The valve body has a relatively narrow neck opening 15 positioned below the top end 16 of the valve and an opening 17 above the neck opening and of somewhat larger radius affording space for packing and the like, to be described later.

Beneath the neck opening 15 the bore of the valve body expands to provide a spring guide portion 18, the bore flaring outwardly approximately midway of the valve body to provide a main bore 19. The main bore 19 has at its lower region a pair of outwardly stepped portions 20 and 21 of gradually increasing diameter, the portion 21 receiving a tube 22 for a valve guide to be described later.

Threadedly received by the neck opening 15 is an adjusting screw 23 having an axial bore 24 and a head 25 with wrench-engaging surfaces thereon, such adjusting screw being in the form of a sleeve. In order to prevent leakage through the neck portion from the interior of the valve past the adjusting screw 25, packing 26 is positioned in the opening 17 with a packing gland 27 engaging it and being maintained under suitable compression by an adjusting nut 28 threadedly engaged with the adjusting screw 23. A plug 29 is provided at the exposed end of the adjusting screw and is conventionally sealed by a suitable compound, or the like.

Slidably received within the bore 24 of the adjusting screw 23 is an end portion of an elongated pin 30, the pin having its other end press-fitted into the axially raised portion 31 of a guide 32 which is received in the tube 22 mounted in the bore of the housing below the side opening 13.

The guide 32 comprises an approximately circular central disc portion 33 (shown as substantially octagonal for facilitating fabrication by milling) having a plurality of equally spaced arms 34, four being shown, extending transversely from the central portion. Each arm has a foot 35 extending parallel to the axis of the guide, the inner surfaces of the feet and the underside of the central portion of the guide providing a guide chamber 36. The lower portions of the inner surfaces of the feet 35 have grooves 37 for receiving a snap ring 38.

A valve button 40 is positioned in the chamber 36, the button being of substantially cylindrical configuration and having an upper portion 41, and a lower portion 42 of reduced diameter, the snap ring 38 encircling the lower portion 42 to retain the button within the chamber 36 of the guide. The lower surface of the button 40 is coated with a layer of relatively soft non-corrosive material, such as solder, in order that engagement thereof with the seat, later to be described, may be as closely fitting as possible in order to avoid leakage.

The upper surface of the valve button 40 and the lower surface of the guide 32 have shallow axial recesses 44 and 45, respectively, for receiving a ball 46. The button 40 has sufficient play in the chamber 36 of the guide 32 and is spaced therefrom by the ball 46 in such manner that limited swiveling of the button within the guide chamber is permitted.

While the guide is shown as provided with a plurality of spaced arms, in order to permit fluid to flow past the guide when the valve is open, the guide being positioned below the side opening 13 of the valve housing, it is apparent that other provisions for flow from the inlet to the outlet port may be employed.

Within the bore 18 of the housing 10 a spring guide 50 is slidably mounted on the pin 30 and has an upper central recessed portion 51 for receiving the mating end portion of the adjusting screw 25, the spring guide normally being maintained in abutting relationship with the adjusting screw. A compression spring 52 is positioned between the guide 32 and the spring guide 50 and may be set at the desired initial compression by the positioning of the adjusting screw 25 within the valve, the locking nut 28 maintaining the adjusting screw in the position at which it is set.

Within the lower opening of the valve body 10 a valve seat 54 is mounted, a suitable gasket 55 being provided between the seat and the adjoining portion of the housing. The seat has a raised central portion 56 with an axial orifice 57, the inside diameter of the seat being the same as the orifice diameter.

Mounted within the opening 11 is the inlet fitting or end cover 12, a gasket 58 being positioned between it and the seat 54. Spaced fastening members 59 extending through the cover 12 engage the lower portion of the body 10 for holding the end cover 12 in position. An inlet conduit 60 is threadedly received within the cover 12.

A seal cap or dome 61 is mounted on the top end portion of the valve housing 10, covering the exposed portions of the adjusting screw, the adjusting nut and packing gland, and a lead seal 62 is provided for securing wire 63 to ears 64 and 65 mounted on the seal 61 and the housing 10.

A vent plug 66 is theadedly engaged in a side opening 67 extending into the bore 18 of the housing and a drain plug 68 is threadedly engaged with the lower portion of the housing 10 for closing side opening 69 just above the valve seat. Both plugs are conventionally sealed by a suitable compound or the like.

In order that the valve stem and guide be accurately centered in the valve housing, the tube 22 is press-fitted into position before its final machining operation. After the tube is thus located, the bore 15 for the adjusting screw, the inside surface or bore of the tube 22, and the facing 12' for the seat insert, are machined in a single set of operations thus permitting accurate alignment.

It is apparent, therefore, that the pin 30 and guide 32 may be accurately axially aligned with the housing 10 of the valve body, that the relatively great length of the stem facilitates the accommodation of any misalignment, and that binding does not occur between the closely fitting surfaces of the valve guide 32 and the tube 22. Thus, the valve button 40 is moved axially and transversely of the seat 54 in order to provide for the smoothest possible action and may swivel slightly within the guide in order to perfectly seat.

Furthermore, inasmuch as the button 40 is carried and substantially housed by a guide 32 which moves within a surrounding bore, the immediate guiding surfaces for the guide are positioned laterally of the button and seat, thus providing for greater accuracy of movement of the movable valve member relative to its seat.

In the operation of the device, fluid is retained in the inlet opening of the valve underneath the button 40 until its pressure on the button exceeds the force holding the valve closed, which force is regulated by the adjustment of the screw 23 against the spring guide 50 and spring 52. Upon the lifting of the valve, fluid escapes between the arms 34 of the valve guide and out the exhaust side of the valve. As soon as the pressure has dropped to a point low enough to permit the valve to close, the spring member will force the movable valve member back to the seat 54.

Accordingly, the invention comprises a relief valve having the relatively moving surfaces thereof accurately aligned in order to guide the valve without binding and in which the number of parts and the possibility of error in the fabrication and operation of such parts have been reduced to a minimum.

While there is disclosed a specific embodiment of the invention, it will be understood by those skilled in the art that the invention is not limited to the specific structure disclosed, but only as appears in the appended claims.

What is claimed is:

1. A safety valve comprising a hollow elongated valve housing having an inlet at one end, an outlet at the side and an axial neck portion of reduced diameter adjacent the other end, an elongated sleeve engaged with the neck portion and extending into the valve housing, means for adjusting the position of the sleeve within the neck portion, an elongated pin slidably mounted in the sleeve, an end portion of the pin extending beyond the sleeve into the valve housing, a guide connected to said end of the pin, said guide having a body extending transversely of the pin, the pin being attached substantially centrally thereof, said body having passage means therethrough, retaining means attached to and spaced below the body and extending radially inwardly, a relief valve button between the central portion of the guide and the retaining means, the under-side of the central portion and the upper side of the button each being provided with an axial recess, a ball engaging the recesses and permitting limited swiveling of the button, a compression spring positioned within the housing and around the pin, means engaging the end of the sleeve within the housing on one side and an end of the compression spring on the other side, the other end of the spring engaging the guide, sleeve means intimately engaging the lower portion of the valve housing and slidably receiving the guide, a valve seat member mounted in the housing adjacent the sleeve means, said seat having a raised apertured central portion extending into the valve housing and within the sleeve means, said raised portion providing a valve seat for engagement with the button, and an end cover attached to the lower end of the valve housing and retaining the seat in place.

2. A safety valve comprising a hollow elongated valve housing having openings at an end and at the side for the passageway of fluid, and an axial neck portion of reduced diameter adjacent to the other end, an adjusting screw engaged with the neck portion and extending into the valve housing, the screw having an axial bore, means for retaining the screw in a desired position relative to the neck portion, an elongated pin slidably mounted in the bore of the screw and having an end portion extending beyond said screw into the housing, a guide rigidly attached to said end of the pin and slidably received in a bore of the valve housing, said guide having a chamber on its underside and having means for the rapid passage of fluid past the guide, a valve member, centering means mounting said valve member for universal limited rockable movement and preventing lateral movement of said valve member within said chamber, a valve seat mounted adjacent the fluid passageway end of the valve housing and having a raised apertured central portion providing a seat for the valve member, and spring means under compression abutting the adjusting screw at one end and the guide at the other.

3. A safety valve comprising a hollow elongated valve housing having an end and a side opening for the passage of fluid, an elongated pin positioned axially within the housing, a guide member rigidly attached to an end of the pin within the housing and having substantially cylindrical walls engaging the bore of said housing, a valve member, centering means mounting said valve member for universal limited rockable movement on the guide member and preventing lateral movement of said valve member, a seat member positioned transversely of the axis of the valve housing and having a raised apertured central portion providing a seat adapted to engage the valve member, the seat member being mounted with its periphery engaging an enlarged portion of the bore of the valve housing, guiding means mounted within the upper portion of the housing and slidably receiving the pin, the portions of the bore of the housing receiving the guiding means and the guide member having a common axis, and spring means abutting the guiding means at one end and the guide member at the other.

4. A safety valve comprising a hollow elongated valve housing having an end and a side opening for the passage of fluid, an elongated pin positioned axially within the housing, a guide member rigidly attached to an end of the pin within the housing and having substantially cylindrical walls engaging the bore of said housing, a valve member, centering means mounting said valve member for universal limited rockable movement on the guide member and preventing lateral movement of said valve member, a seat member positioned transversely of the axis of the valve housing and having a raised apertured central portion providing a seat adapted to engage the valve member, guiding means mounted within the upper portion of the housing and slidably receiving the pin, the portions of the bore of the housing receiving the guiding means and the guide member having a common axis, and spring means abutting the guiding means at one end and the guide member at the other.

5. A safety valve comprising a hollow elongated valve housing having an end and a side opening for the passage of fluid, an elongated pin positioned axially within the housing, a guide member rigidly attached to an end of the pin within the housing and being slidably received by the walls of said housing, a valve member, centering means mounting said valve member for universal limited rockable movement within the guide member and preventing lateral movement of said valve member, a seat member positioned transversely of the axis of the valve housing and having a raised apertured central portion providing a seat adapted to engage the valve member, guide means mounted within the upper portion of the housing and slidably receiving the pin, the guide member having a recess for the reception of the valve member, the surface of the guide member which contacts the walls of the housing being disposed laterally of the valve member, and spring means abutting the guide means at one end and the guide member at the other.

6. A safety valve comprising a hollow elongated valve housing having an inlet at one end, an outlet at the side and a neck portion adjacent to the other end, an elongated sleeve engaged with the neck portion, an elongated pin slidably mounted in the sleeve, an end portion of the pin extending beyond the sleeve into the valve housing, a transversely extending valve guide rigidly connected to said end portion of the pin, the pin being attached substantially centrally thereof, said valve guide having means for retaining a valve member on its under side, a seat type valve member, centering means mounting said valve member for universal limited rockable movement on the under side of said valve guide and preventing lateral movement of said valve member, said valve guide having passage means therethrough not blocked by the valve member when the latter is off its seat, a compression spring positioned within the housing and around the pin, guide means for one end of the spring remotely spaced from the housing inlet and having an opening through which said pin extends, said valve guide having guide means engaging the other end of said spring, and a valve seat positioned transversely of the valve housing adjacent to the inlet.

7. A safety valve comprising a hollow elongated valve housing having an inlet opening and a discharge opening, an elongated valve stem positioned longitudinally within the housing, guide means for the stem within the housing and remote from the inlet opening, a valve guide member positioned transversely of the valve housing and having a raised central portion rigidly connected to an end of the stem adjacent to the inlet opening, said valve guide member being slidably received by the walls of said housing, a valve member, centering means mounting said valve member for universal limited rockable movement on the valve guide and preventing lateral movement of said valve member, a valve seat positioned transversely of the valve housing for engagement by said valve member, longitudinal spring means receiving at one end said raised central portion of said valve guide member, and spring guide means remote from said inlet end and slidably received by the walls of said housing and having a raised central portion in engagement with the other end of said spring means.

References Cited in the file of this patent

UNITED STATES PATENTS

| | | |
|---|---|---|
| 217,745 | Pringle | July 22, 1879 |
| 1,551,547 | Darling | Sept. 1, 1925 |
| 2,292,294 | Rotter | Aug. 4, 1942 |
| 2,352,249 | Briggs | June 27, 1944 |
| 2,355,916 | Klafstad | Aug. 15, 1944 |
| 2,443,851 | Corcoran | June 22, 1948 |
| 2,631,605 | Tobis | Mar. 17, 1953 |

FOREIGN PATENTS

| | | |
|---|---|---|
| 813,229 | France | Feb. 22, 1937 |
| 121,570 | Great Britain | Dec. 24, 1918 |
| 201,708 | Great Britain | Aug. 9, 1923 |